United States Patent [19]
Akedo

[11] Patent Number: 5,805,971
[45] Date of Patent: Sep. 8, 1998

[54] METHOD OF PRODUCING THREE-DIMENSIONAL FORMS

[75] Inventor: Jun Akedo, Tsukuba, Japan

[73] Assignee: Agency of Industrial Science & Technology, Ministry of International Trade & Industry, Tokyo, Japan

[21] Appl. No.: 527,331

[22] Filed: Sep. 12, 1995

[30] Foreign Application Priority Data

Sep. 13, 1994 [JP] Japan .................................. 6-244672

[51] Int. Cl.⁶ .............................. B22F 7/04; B22F 7/02
[52] U.S. Cl. ...................... 419/6; 419/7; 419/8; 419/9; 419/37
[58] Field of Search .................. 419/6, 36, 37, 419/38, 7, 8, 9, 47

[56] References Cited

U.S. PATENT DOCUMENTS 5,136,515  8/1992  Helinski .
5,203,944  4/1993  Prinz et al. .
5,207,371  5/1993  Prinz et al. .
5,286,573  2/1994  Prinz et al. .
5,301,415  4/1994  Prinz et al. .
5,555,481  9/1996  Rock et al. .
5,590,454  1/1997  Richardson .

*Primary Examiner*—Daniel J. Jenkins
*Attorney, Agent, or Firm*—Oblon, Spivak, McClelland, Maier & Neustadt, P.C.

[57] ABSTRACT

A method of producing a three-dimensional form includes the steps of spraying from at least one nozzle a gas including particles of materials having different properties onto a base surface to deposit a layer of particles, repeatedly spray-depositing layers of particles each on the upper surface of a deposition layer, thereby building up a three-dimensional object consisting of the accumulated deposition layers each having different properties in a two-dimensional plane, and utilizing the different properties in the accumulated deposition layers to remove part of the three-dimensional object, thereby producing a desired three-dimensional form.

8 Claims, 3 Drawing Sheets

5,805,971

METHOD OF PRODUCING THREE-DIMENSIONAL FORMS

BACKGROUND OF THE INVENTION

1. Field of the Invention

This invention relates to a method of producing three-dimensional forms used in fabrication of micro-actuators, micro-pumps, micro-sensors and other such micromachines, rapid prototyping, the manufacture of parts having complex forms, and the correcting and additional machining of dies and the like.

2. Description of the Prior Art

In recent years the trend in machine technology has been toward micromachines, and demands have increased with respect to the small-lot production of a variety of items and the complexity of machined shapes. It has become difficult to meet such demands with conventional machining. For these purposes, attention has focussed on optical molding methods in which light-setting resins and laser beam scanning are used to produce desired complex three-dimensional forms. Since with this technology, computer-generated three-dimensional CAD data is used to directly produce the forms, it is able to meet the above demands.

However, the drawbacks of these optical molding methods are that they can only be used with special resins, and the precision is only on the order of 100 μm. Furthermore, these molding methods can only be used with light-setting resin, not pure metal materials, and the shrinkage that accompanies the setting gives rise to major problems in terms of the precision and strength of the molded object. Even in the case of techniques such as selective laser sintering of metal particles, three-dimensional printing, ballistic particle manufacturing (in which metal particles are sprayed with bonding material) and the like, in which sintering is used to strengthen the bonds between metal particles, shrinkage still generates strain, and in the case of metal deposition using negative and positive masks, the hardening of deposited layers is accompanied by shrinkage, causing bending and separation of layers.

Recently the generation of three-dimensional forms by metal spraying and sintering and/or deposition of metal particles has been tried using materials other than resin. However, in the case of spraying, large internal stresses build up when the deposited metal layers dry, producing strains and warping in the resulting forms. Sintering produces a very coarse surface and many internal holes, so the metal fill factor is low and it is difficult to improve the mechanical strength. Also attracting attention as a processing technique that can be used for micromachining is high-aspect ratio silicon fine patterning using x-rays and deep ultraviolet rays. However, these are still limited in the shapes that can be generated, and the apparatuses are too large and costly to be practical. Thus, in the conventional methods there is the major problem of the shrinkage of the formed object that accompanies the setting. Also, owing to this shrinkage, precision and resolution are limited to around 100 μm.

SUMMARY OF THE INVENTION

The object of the present invention is to provide a method in which particles of various materials are deposited with high precision to produce three-dimensional forms having good mechanical strength and electrical and optical functions.

To attain the above object, the present invention provides a method of producing a three-dimensional form by repeatedly depositing on a base surface layers of particles of materials having different properties by spraying from at least one nozzle a gas including the particles, to thereby build up a three-dimensional object by accumulating deposition layers each having different properties in a two-dimensional plane, then utilizing the different properties in the accumulated deposition layers to remove part of the three-dimensional object to produce a desired three-dimensional form.

As described in the foregoing, two metals having different melting points are sprayed from nozzles and deposited on a substrate while the stage on which the substrate is mounted is being moved, forming a deposition layer of particles in which there is a portion formed of a different material, in accordance with sectional CAD data of a three-dimensional form. By repeating this operation, a solid object is formed that includes a three-dimensional form formed by a high melting point material portion. This deposition layer is then placed in an electric furnace to remove low melting point material by melting the material, to thereby produce a desired three-dimensional form. This invention can use any material that can be obtained in the form of active particles not larger than 0.1 μm, and even if the particles are then sintered, the effect of the shrinkage thereof is greatly reduced. Moreover, it is also possible to form composites in which there are portions having different properties, or inclined function structures, and electrical functions, such as sensors, wiring, electronic parts and the like, can be incorporated at the same time as forms are produced. To achieve a high speed particle jet, a small nozzle diameter of around 10 μm is used, thereby ensuring that the attainable precision is also as high. Using low melting point metal as the layer portions that are removed to form three-dimensional shapes makes it possible to fabricate complex microparts.

The above and other features of the present invention will become apparent from the following description made with reference to the drawings.

BRIEF EXPLANATION OF THE DRAWINGS

FIGS. 1 illustrate stages in the method of producing three-dimensional forms according to this invention;

DESCRIPTION OF THE PREFERRED EMBODIMENTS

Figure 1A:
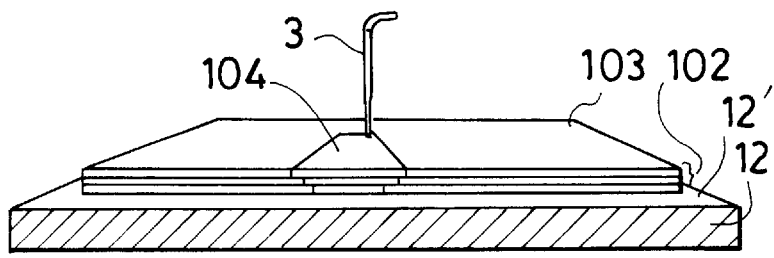
FIG. 1(a) illustrates the formation of the accumulated deposition layers on the substrate.
Figure 1B:
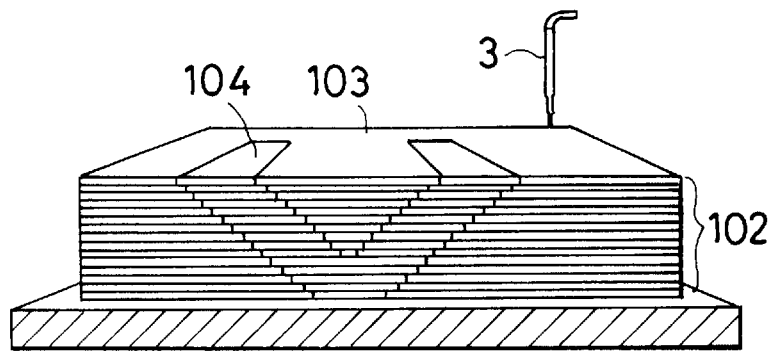
FIG. 1(b) shows the finished deposition layers.
Figure 1C:
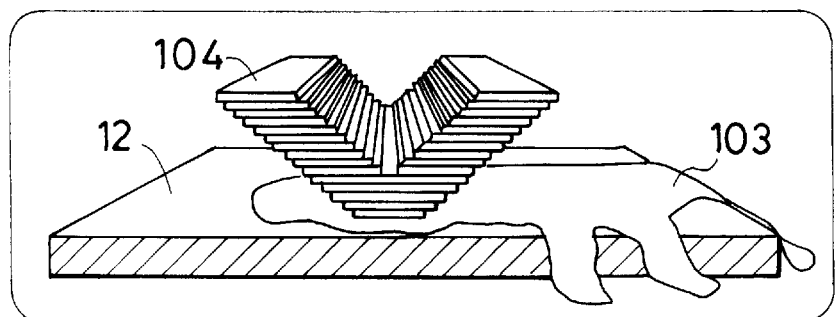
FIG. 1(c) shows the deposition layers after the removal of the low melting point material.
Figure 1D:
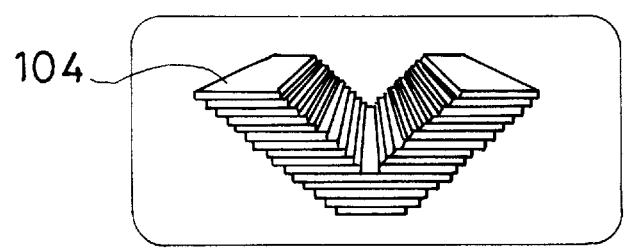
FIG. 1(d) shows the remaining high melting point material that has been sintered.
Figure 1E:
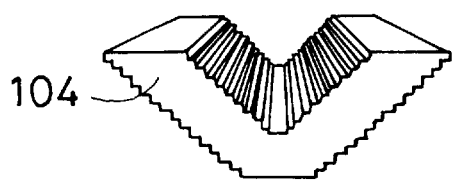
FIG. 1(e) shows the three-dimensional form produced by the method of the invention.

The principle of the method of producing three-dimensional forms will now be described. When a metal or organic substance in an inert gas at a reduced pressure of $10^{-1}$ Torr or more is evaporated by resistance heating, electron beam heating, high frequency induction heating, sputtering, arc plasma or the like, highly active particles are formed on the surface having a diameter of 0.1 μm or less. When an inert gas such as Ar or He is used to transport these particles at a flow velocity of 300 m/s or more onto a substrate surface, the high kinetic energy of the particles is instantaneously transformed into thermal energy, strongly bonding the particles to the substrate surface. Virtually all the thermal energy goes into the bonding, so that, without unduly raising the substrate surface temperature, it is possible to form a film 10 μm thick or thicker having a density and strength on a par with those of a film formed by vacuum deposition or sputtering. Moreover, deposition can proceed at a very high rate by using the particles accumulated in the tank containing the inert gas. By utilizing this, for example, as shown in FIG. 1 in which a substrate 12 is mounted on a stage 21 that is being moved while metals having two different melting points are sprayed from a nozzle 3 onto the substrate, whereby, in accordance with three-dimensional form sectional CAD data, a particle layer is formed in which portions 103 and 104 are constituted of materials having different properties (FIG. 1(a)). The low melting point material portion 103 provides support for when the next layer is being formed. By repeating this operation, an accumulated deposition layer 102 is formed that includes a three-dimensional form formed by the high melting point material portion 104 (FIG. 1(b)). An electric furnace is then used to heat the deposition layer 102 to an intermediate temperature between the melting point of the high melting point material and the melting point of the low melting point material, melting away the supporting low melting point material portion 103 to thereby produce the desired high melting point material portion 104. The blowing through of high temperature gas facilitates the removal of the low melting point material (FIG. 1(c)). The remaining high melting point material is then heated to an appropriate temperature in the electric furnace to sinter it and thereby increase its mechanical strength (FIG. 1(d)). A laser or the like may be used to provide partial heating after the particles have been sprayed from the nozzle 3.

Figure 2:
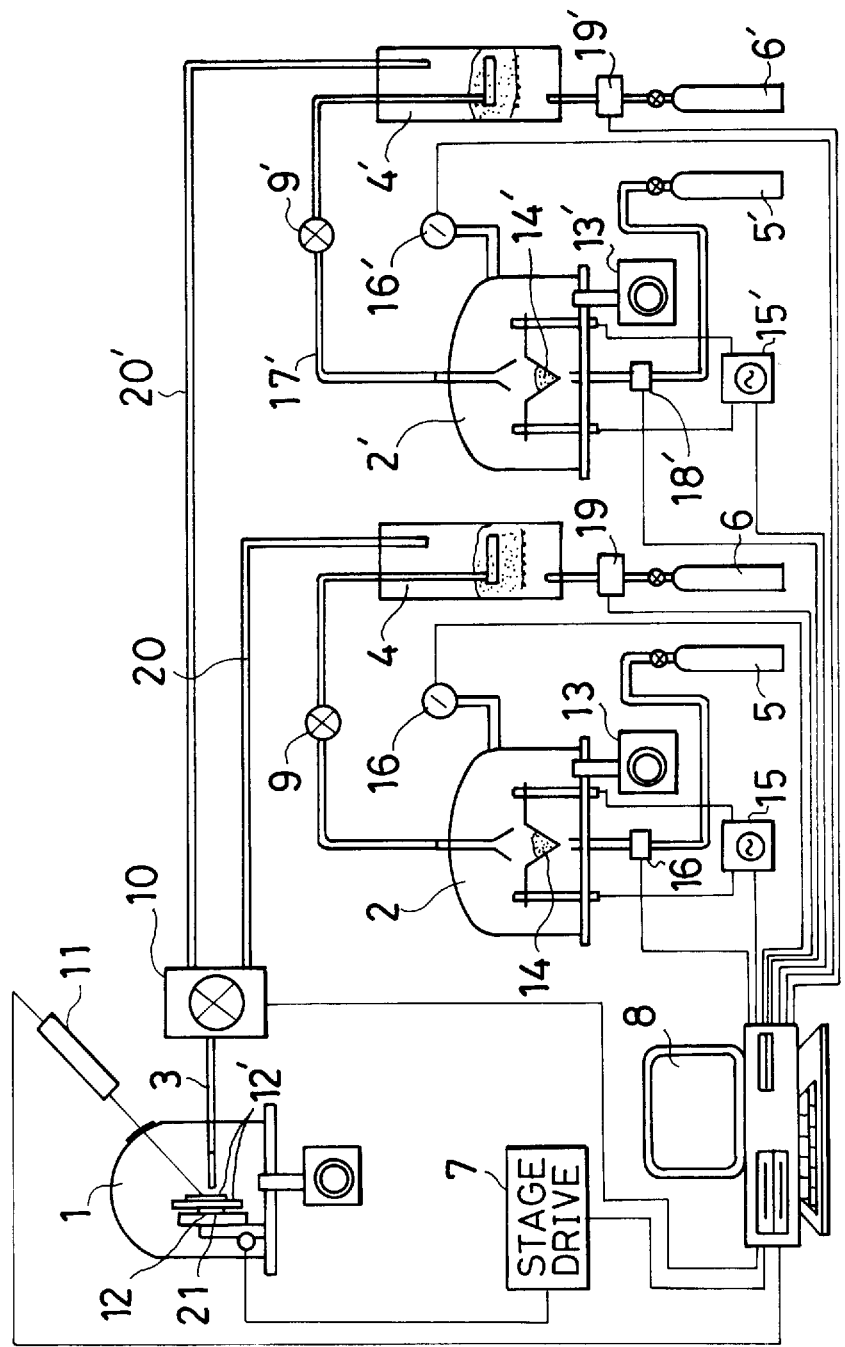
FIG. 2 shows the arrangement of an apparatus used to implement the method of the invention.
Figure 3:
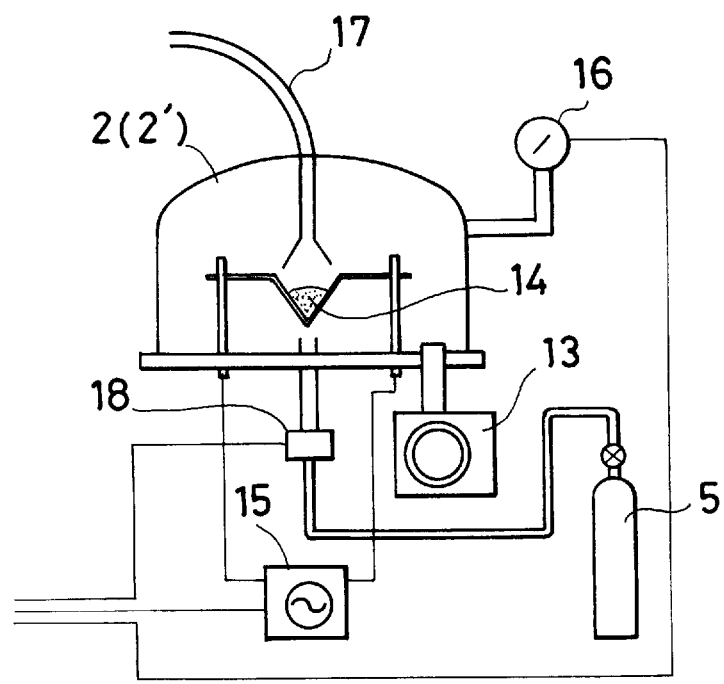
FIG. 3 is an enlarged view of an evaporation chamber of the apparatus of FIG. 2.

FIG. 2 shows an example of an apparatus used to implement the method of producing three-dimensional forms according to the present invention. Reference numerals 2 and 2' denote evaporation chambers each used to produce particles of a different metal. FIG. 3 is an enlarged view of this part of the apparatus. Vacuum pumps 13 and 13' are used to evacuate the evaporation chambers 2 and 2' to around $10^{-6}$ Torr. An inert gas such as He, Ar or the like is then introduced into the chambers from gas cylinders 5 and 5'. Vacuum readings provided by vacuum gages 16 and 16' are checked while using control valves 18 and 18' to produce a vacuum of around 100 Torr in the evaporation chambers 2 and 2'. Some 400 watts of electrical power is delivered to a high frequency induction heating apparatus comprised by evaporation materials 14 and 14' and power supplies 15 and 15'. The magnetic repulsion between the magnetic flux generated in the evaporation material by the induction current and the magnetic flux generated by the high frequency current is used to suspend the evaporation material in the gas. The evaporation material is maintained in this clean state while evaporation is effected to produce particles having a diameter not larger than 0.1 μm. The pressure differential between the evaporation chambers and a deposition layer formation chamber 1 which has been evacuated by vacuum pump to a pressure of 1 Torr or below, causes the particles thus generated to be drawn through discharge pipes 17 and 17' and accumulated in particle trapping chambers 4 and 4', shown in FIG. 2. When enough particles have been accumulated to produce the required three-dimensional form, shutoff valves 9 and 9' are closed.

The formation of a thin film of particles on base surface 12' of the substrate 12 in the deposition layer formation chamber 1 will now be described. Control needle valve 19 is opened to introduce He, Ar or other such inert gas from a compressed gas cylinder 6 into the particle trapping chambers 4 and 4'. A pressure differential of about 5 atmospheres is maintained between the trapping chambers 4 and 4' and the deposition layer formation chamber 1. Thus, when a selector valve 10 is used to connect discharge pipe 20 with nozzle 3, particles in the trapping chamber 4 flow out through the nozzle 3 and onto the base surface 12' of the substrate 12 at a subsonic velocity of 300 m/s or more, forming a dense particle layer. If the distance between the tip of the nozzle 3 and the base surface 12' is around 0.2 mm to 1 mm, the nozzle inside diameter and the width of the deposited layer will be substantially the same, producing sharply defined edges. Using a stage drive 7 to move the stage 21 on which the substrate 12 is mounted in a prescribed direction, the selector valve 10 is operated to connect the nozzle 3 with the discharge pipe 20', and thereby use the particles in the trapping chamber 4' to form a deposition layer.

As the materials having different melting points used to produce particles having different properties in accordance with this invention, a material having a lower melting point than that of structural material (i.e., high melting point material) may be used as sacrifice layer material. It is preferable to use a combination in which heat from the sacrifice layer material does not readily diffuse into the structural material. Accordingly, materials that can be used for the sacrifice layer include pure metals such as Cu, Ag, Al, Sb, Zn, and Sn; alloys such as solder (Sn—Pb; melting point: 189° C. to 316° C.), aluminum solder (melting point: 250° C. to 450° C.), and low melting point silver alloy solder (Ag—Sn—Pb, Ag—Pb, Ag—Sn, Ag—Sn—Cu, Ag—Cd—Zn, Ag—Cd); polyethylene, polyamide, polyimide, polypropylene, PMMA, polyether sulfone, thermoplastic polyester, copolymer of polyhexafluoropropylene and polytetrafluoroethylene, polyfluorovinylidene, organic composite photoresist materials (diazo compounds, azido compounds, nitro compounds, polyvinyl cinnamate); and dry film type resists (for example, Riston, made by Dupont Inc.).

Listed below are examples of combinations of structural formation materials and sacrifice layer materials.

Mo, W, Ir—metals and alloys having a melting point up to around 1500° C.,

FeCo, FeNi and other high melting point alloys—Ag Cr—Al, Zr—Al, Pt—Cu, Ti—Cu. Fe—Ag, Co—Al, Ni—Al, Mo—Al, Cu—Al, Sm—Al, Au—Al, Ag—Al, Al—Zn, Zn—Sn, Pb—Sn PZT-Al, PLZT-Al, Si—Al, BTO-Al, SiGe Al, $Fe_3O_3$—Al, $Al_2O_3$—Ag, $SiO_2$—Al (i.e., the structural material is shown to the left of a hyphen, and sacrifice layer material to the right.)

An embodiment of the method of producing three-dimensional forms utilizing the above particle deposition layer method, in accordance with the present invention, will now be described with reference to FIGS. 1 and 2.

As can be seen, the apparatus shown in FIG. 2 has two particle production units comprised of the evaporation chambers 2 and 2' used to generate the particles, as described above, and particle trapping chambers 4 and 4'. These units were used to generate particles of aluminum and nickel in sufficient quantities to produce the required three-dimensional form. The particles of each material were accumulated in trapping chambers 4 and 4', respectively. High pressure inert gas from gas cylinders 6 and 6' was used to transport the particles of each material, via discharge pipes 20 and 20' and selector valve 10, to the nozzle 3, from which the particles were sprayed onto the base surface 12' of the substrate 12. The control operations of the selector valve 10 and needle valves 19 and 19' are interlinked, enabling switching between the two types of particles to be accomplished in one second or less. The substrate 12, having the base surface 12' on which the particles are deposited, is mounted on a stage 21 movable along the x, y and z axes by a drive 7. The amount and speed of the stage movement are controlled by a computer 8. In accordance with three-dimensional form section CAD data, the stage 21 was moved in association with particle selection operation of the selector valve 10 to form the particle deposition layer shown in FIG. 1(a), in which the high melting point material portion 104 is comprised of nickel (melting point: 1455° C.) and the low melting point material portion 103 is comprised of aluminum (melting point: 660° C.). In this example, the carrier gas used was helium, which sprayed the particles at a flow velocity of around 500 m/s from a nozzle 3 having an inside diameter of 50 μm. Taking the flow of particles from the nozzle as being constant, the layers of nickel and aluminum were deposited in identical 10-μm thicknesses by using an optical measuring device 11 to measure the layer thickness of the particle deposition on a real-time basis, and controlling the motional speed of the stage 21. For deposition of the next layer, the stage 21 is then moved along the z axis. These operations were repeated to form a block measuring 3 mm by 3, comprised of 200 layers, in which the high melting point nickel was used to form the required three-dimensional form portion, which was surrounded by the low melting point aluminum. This block was placed in an electric furnace at 700° C. in an argon gas atmosphere to melt off the unrequired aluminum portion. The temperature was then raised to about 1200° C. to sinter the particles into a three-dimensional form that, with the sintering causing almost no shrinkage, exhibited good shape precision of 70 μm and, with a Vickers hardness of about 500, good strength.

An embodiment will now be described in which iron is used as the high melting point material and silver as the low melting point material. Evaporation chambers 2 and 2' were used to generate particles of iron and silver in sufficient quantities to produce the required three-dimensional form, and the particles of each material were accumulated in the trapping chambers 4 and 4', respectively. High pressure inert gas from gas cylinders 6 and 6' was used to transport the particles of each material, via discharge pipes 20 and 20' and selector valve 10, to the nozzle 3, from which the particles were sprayed onto the base surface 12' of the substrate 12. The control operations of the selector valve 10 and needle valves 19 and 19' are interlinked, enabling switching between the two types of particles to be accomplished in one second or less. The substrate 12, having the base surface 12' on which the particles are deposited, is mounted on a stage 21 movable along the x, y and z axes by a drive 7. The amount and speed of the stage movement are controlled by a computer 8. In accordance with three-dimensional form section CAD data, the stage 21 was moved in association with particle selection operation of the selector valve 10 to form the particle deposition, layer shown in FIG. 1 (a), in which the high melting point material portion 104 is comprised of iron (melting point: 1535° C.) and the low melting point material portion 103 is comprised of silver (melting point: 962° C.). In this example, the carrier gas used was helium, which sprayed the particles at a flow velocity of around 500 m/s from a nozzle 3 having an inside diameter of 50 μm. Taking the flow of particles from the nozzle as being constant, the layers of iron and silver were deposited in identical 10-μm thicknesses by using an optical measuring device 11 to measure the layer thickness of the particle deposition on a real-time basis, and controlling the motional speed of the stage 21. For deposition of the next layer, the stage 21 is then moved along the z axis. These operations were repeated to form a block measuring 3 mm by 3, comprised of 200 layers, in which the high melting point iron was used to form the required three-dimensional form portion, which was surrounded by the low melting point silver. This block was placed in an electric furnace at 1100° C. in an argon gas atmosphere to melt off the unrequired silver portion. The temperature was then raised to about 1350° C. to sinter the particles into the three-dimensional form. The sintering caused almost no shrinkage, resulting in a strong three-dimensional form of iron exhibiting a smoother surface than in the case of the embodiment using nickel and aluminum, with a high shape precision of around 50 μm.

By patterning the deposition of the sacrifice portion on a layer by layer basis before formation of the structural material layers, the sacrifice layers can be used like a mask in the formation of the structural material layers. For this, the sacrifice layers can be formed by uniform deposition of particles of polyimide, polyether sulfone or other such material that has excellent heat resistance and can be precision machined by excimer laser. Abrasion by ArF excimer laser (248 nm) can then be used to etch through in the shape of the structural layer form, followed by pattern formation of the sacrifice layer functioning as a mask for the following structural material layer deposition. Aluminum is a metal that can be used as the material for sacrificial layers having a mask function, selectively etched by being irradiated in a mixed gas of $BCl_3$ and $Cl_2$ by $N_2$ laser (337 nm), XeCl laser (308 nm), ArF excimer laser (193 nm) or the like; or, a non-metallic substance such as silicon can be used for the sacrifice layers, with selective etching by irradiation in $NF_3$ gas by an ArF excimer laser, or in $Cl_2$ gas by a XeCl laser, the same as when polyimide or another polymer is used, in each case enabling a sacrifice layer to be formed that functions as a high precision mask layer.

This invention can use any material that can be obtained in the form of active particles not larger than 0.1 μm, and even if the particles are then sintered, the effect of the shrinkage thereof is greatly reduced. Moreover, it is also possible to form composites in which there are portions having different properties, or inclined function structures, and electrical functions, such as sensors, wiring, electronic parts and the like, can be incorporated at the same time as forms are produced. To achieve a high speed particle jet, a small nozzle diameter of around 10 μm is used, thereby ensuring that the attainable precision is also as high.

Conventionally, the sacrifice layer etching used in semiconductor fine pattern processing and the like has been used to assemble microcomponents. However, their two-dimensional nature makes it difficult to set up complex forms, and also increases the number of process steps. In contrast, by enabling three-dimensional formation of sacrifice layer portions, the present invention makes it possible to assemble complex microcomponents.

What is claimed is:

1. A method of producing a three-dimensional form, comprising the steps of: repeatedly depositing on a base surface a plurality of layers each of said layers comprising first particles having first properties and second particles having second properties which are different from said first properties by spraying from at least one nozzle a gas including the first and second particles at a flow velocity of 300 m/s or more to transform kinetic energy of the first and second particles into thermal energy that bonds the first and second particles to the base surface and build up a three-dimensional object by accumulated deposition layers, each of said accumulated deposition layers having different properties in a two-dimensional plane; and utilizing the different properties in the accumulated deposition layers to remove part of the three-dimensional object to produce a desired three-dimensional form.

2. A method of producing a three-dimensional form according to claim 1, wherein the spraying of the first and second particles is performed alternatingly.

3. A method of producing a three-dimensional form according to claim 1, wherein the gas comprises an inert gas.

4. A method of producing a three-dimensional form according to claim 1, wherein the first particles have a first melting point and the second particles have a second melting point which is higher than the first melting point and wherein after formation, the three-dimensional form is heated to an intermediate temperature between the melting point of the second particles and the melting point of the first particles to produce a desired three-dimensional form by melting away the first particles.

5. A method of producing a three-dimensional form according to claim 1, which comprises subjecting the three-dimensional form that is produced to sintering at a temperature to increase its mechanical strength.

6. A method of producing a three-dimensional form according to claim 1, wherein the first and second particles comprise a first material that can be decomposed or dissolved by a solvent solution or gas and a second material that is non-decomposable or insoluble, and after formation the solvent solution or gas is used to decompose or dissolve part of the three-dimensional object to produce a desired three-dimensional form.

7. A method of producing a three-dimensional form according to claim 1, which comprises measuring and controlling the thickness of each deposited layer.

8. A method of producing a three-dimensional form according to claim 1, which comprises spraying the particles at a constant rate and controlling the thickness of deposited layers by changing motional speed of the base surface.

* * * * *